United States Patent
Kaye, Jr. et al.

(10) Patent No.: US 6,470,778 B1
(45) Date of Patent: *Oct. 29, 2002

(54) DUST COLLECTOR FOR A POWER TOOL

(75) Inventors: Thomas R. Kaye, Jr., Bel Air, MD (US); Adan Ayala, Owings Mills, MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,611

(22) Filed: Feb. 25, 1999

Related U.S. Application Data

(60) Provisional application No. 60/086,127, filed on May 20, 1998.

(51) Int. Cl.⁷ .............................. B26D 7/18; B27B 5/29
(52) U.S. Cl. ..................... 83/100; 83/471.3; 83/486.1; 83/490; 144/252.1; 451/456
(58) Field of Search ....................... 83/100, 167, 471.2, 83/471.3, 473, 477.1, 490, 485, 486, 486.1

(56) References Cited

U.S. PATENT DOCUMENTS

| | | | |
|---|---|---|---|
| 922,840 A | 5/1909 | Bemiller | |
| 1,476,196 A | 12/1923 | Dobyne | |
| 1,552,553 A | 9/1925 | Georgia | |
| 1,830,151 A | 11/1931 | Wilderson | |
| 1,888,679 A | 11/1932 | Knapp | |
| 2,565,510 A | * 8/1951 | Martin | 451/456 |
| 3,322,169 A | 5/1967 | Hilliard | |
| 3,339,597 A | 9/1967 | Kohler | |
| 3,401,724 A | 9/1968 | Kreitz | |
| 3,585,980 A | 6/1971 | Mellor | |

(List continued on next page.)

FOREIGN PATENT DOCUMENTS

| | | |
|---|---|---|
| DE | 2350245 | 4/1975 |
| DE | 2459440 | 8/1976 |
| DE | 3136590 | 3/1983 |
| DE | 8815327 | 5/1989 |
| EP | 0048331 | 3/1982 |
| EP | 0055896 | 7/1982 |
| GB | 1315720 | 5/1973 |
| GB | 1468096 | 3/1977 |
| GB | 1499692 | 2/1978 |
| IT | 1133993 | 10/1979 |

*Primary Examiner*—Clark F. Dexter
(74) *Attorney, Agent, or Firm*—Adan Ayala, Esq.

(57) ABSTRACT

An improved dust collector for a power tool is employed. The dust collector includes a main body and a first nozzle portion connected to the main body, wherein the first nozzle portion is disposable on the power tool so that, when the main body receives saw dust, a substantial portion of the saw dust travels through the first nozzle portion. Preferably, the main body has a wide front inlet and a rear portion narrower than the front inlet. The main body may also have top, bottom and side walls connecting the front inlet to the rear portion. The first nozzle portion is preferably connected to the bottom wall. A second nozzle portion may also be connected to the rear portion of the main body.

16 Claims, 9 Drawing Sheets

U.S. PATENT DOCUMENTS

| | | |
|---|---|---|
| 3,998,121 A | 12/1976 | Bennett |
| 4,028,975 A | 6/1977 | Bennett |
| 4,063,478 A | 12/1977 | Stuy |
| 4,144,781 A | 3/1979 | Kreitz |
| 4,150,598 A | 4/1979 | Berends et al. |
| 4,201,256 A | 5/1980 | Truhan |
| 4,241,505 A | 12/1980 | Bodycomb, Jr. et al. |
| 4,253,362 A | 3/1981 | Olson |
| 4,255,995 A | 3/1981 | Connor |
| 4,300,426 A | 11/1981 | Weaver |
| 4,367,665 A | 1/1983 | Terpstra et al. |
| 4,489,909 A | 12/1984 | Terpstra et al. ............... 248/99 |
| 4,517,869 A | 5/1985 | Kuhlmann et al. |
| D282,346 S | 1/1986 | Pioch |
| 4,576,072 A | 3/1986 | Terpstra et al. |
| 4,694,720 A | 9/1987 | Brickner, Jr. et al. |
| 4,694,721 A | 9/1987 | Brickner, Jr. |
| 4,721,023 A | 1/1988 | Bartlett et al. |
| D295,823 S | 5/1988 | Brickner, Jr. et al. |
| 4,794,740 A | 1/1989 | Keith et al. |
| 4,799,416 A | 1/1989 | Kumasaka et al. |
| 4,869,142 A | 9/1989 | Sato et al. |
| D305,542 S | 1/1990 | Miyamoto et al. |
| D306,031 S | 2/1990 | Ushiwata, et al. |
| 4,934,233 A | 6/1990 | Brundage et al. |
| 5,038,650 A | 8/1991 | Hodge |
| 5,084,972 A | 2/1992 | Waugh |
| D331,416 S | 12/1992 | Fushiya et al. |
| 5,172,680 A * | 12/1992 | Swan ........................ 83/100 X |
| D336,652 S | 6/1993 | Arehart |
| 5,421,228 A | 6/1995 | Fukinuki |
| 5,445,056 A | 8/1995 | Folci ........................... 83/100 |
| 5,819,619 A | 10/1998 | Miller et al. |
| 5,931,072 A * | 8/1999 | Shibata ..................... 83/100 X |

* cited by examiner

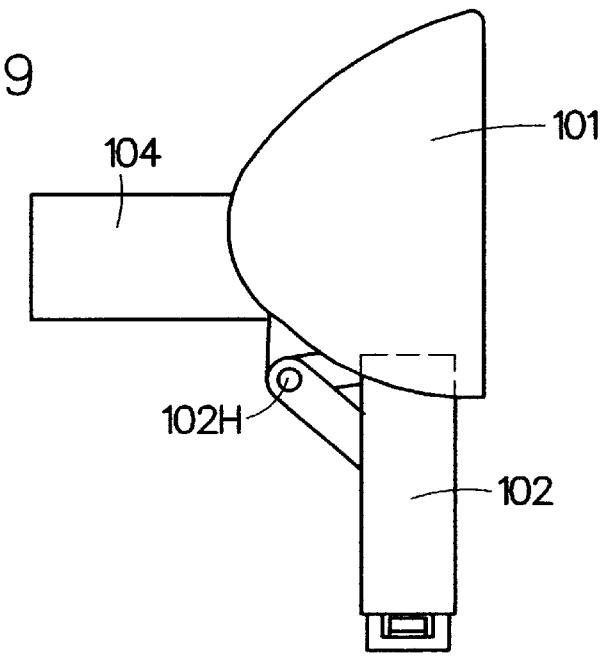
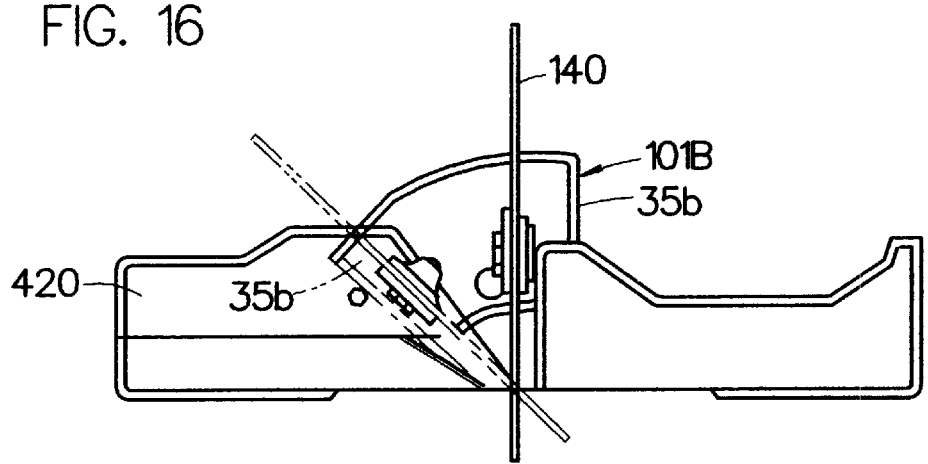

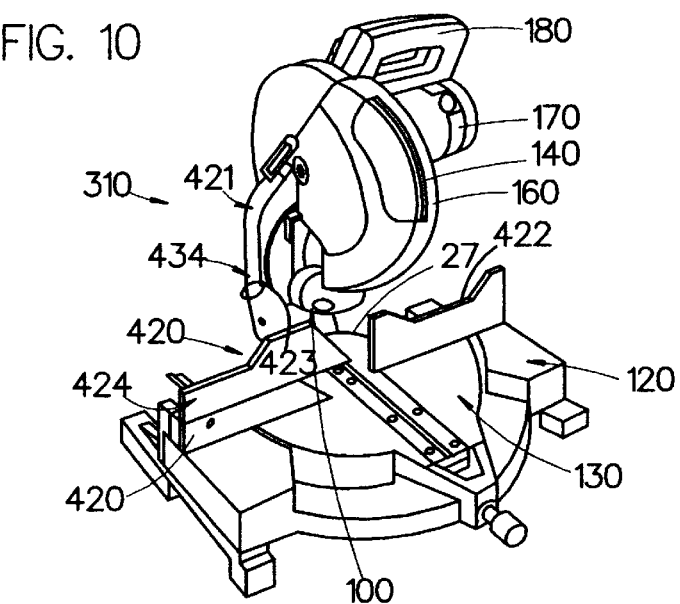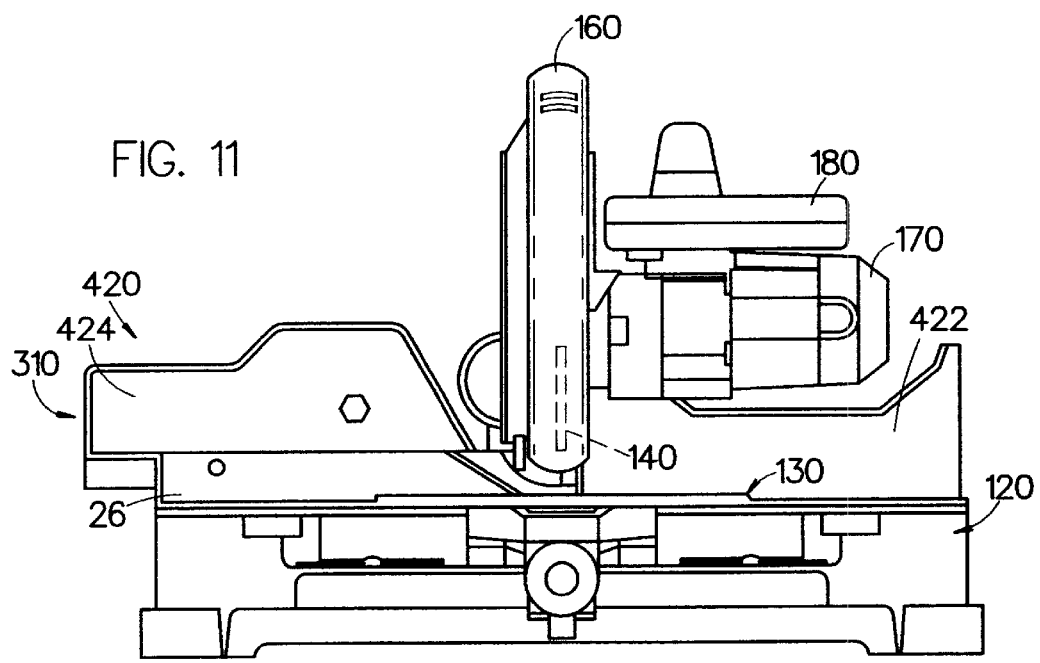

DUST COLLECTOR FOR A POWER TOOL

This application claims the benefit of Provisional Application No. 60/086,127 filed May 20, 1998.

FIELD OF THE INVENTION

This invention relates generally to dust collectors for power tools and, more particularly, to a removable dust collector for a power tool.

BACKGROUND OF THE INVENTION

When cutting a workpiece on a power tool, such as a miter saw, chop saw, etc., it may be desirable to provide a means to collect and exhaust the resulting saw dust. Many prior art solutions do not properly collect dust as they are not in a proper position relative to the cutting tool. Accordingly, it is an object of the present invention to provide a dust collector which can be disposed in a proper position relative to the cutting tool in order to maximize dust collection.

SUMMARY OF THE INVENTION

In accordance with the present invention, an improved dust collector for a power tool is employed. The dust collector includes a main body and a first nozzle portion connected to the main body, wherein saw dust received via the main body travels through the first nozzle portion. Preferably, the main body has a wide front inlet and a rear portion narrower than the front inlet. The main body may also have top, bottom and side walls connecting the front inlet to the rear portion. The first nozzle portion is preferably connected to the bottom wall. A second nozzle portion may also be connected to the rear portion of the main body.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 9 is side view of a fourth embodiment of the dust collector according to the present invention;

FIG. 10 is a front perspective view of an exemplary compound miter saw featuring a dust collector according to the present invention;

FIG. 11 is a front elevational view of the compound miter saw of FIG. 10;

FIG. 16 s a schematic elevational view, diagrammatically illustrating a bevel-cutting operation.

DETAILED DESCRIPTION

Figure 1:
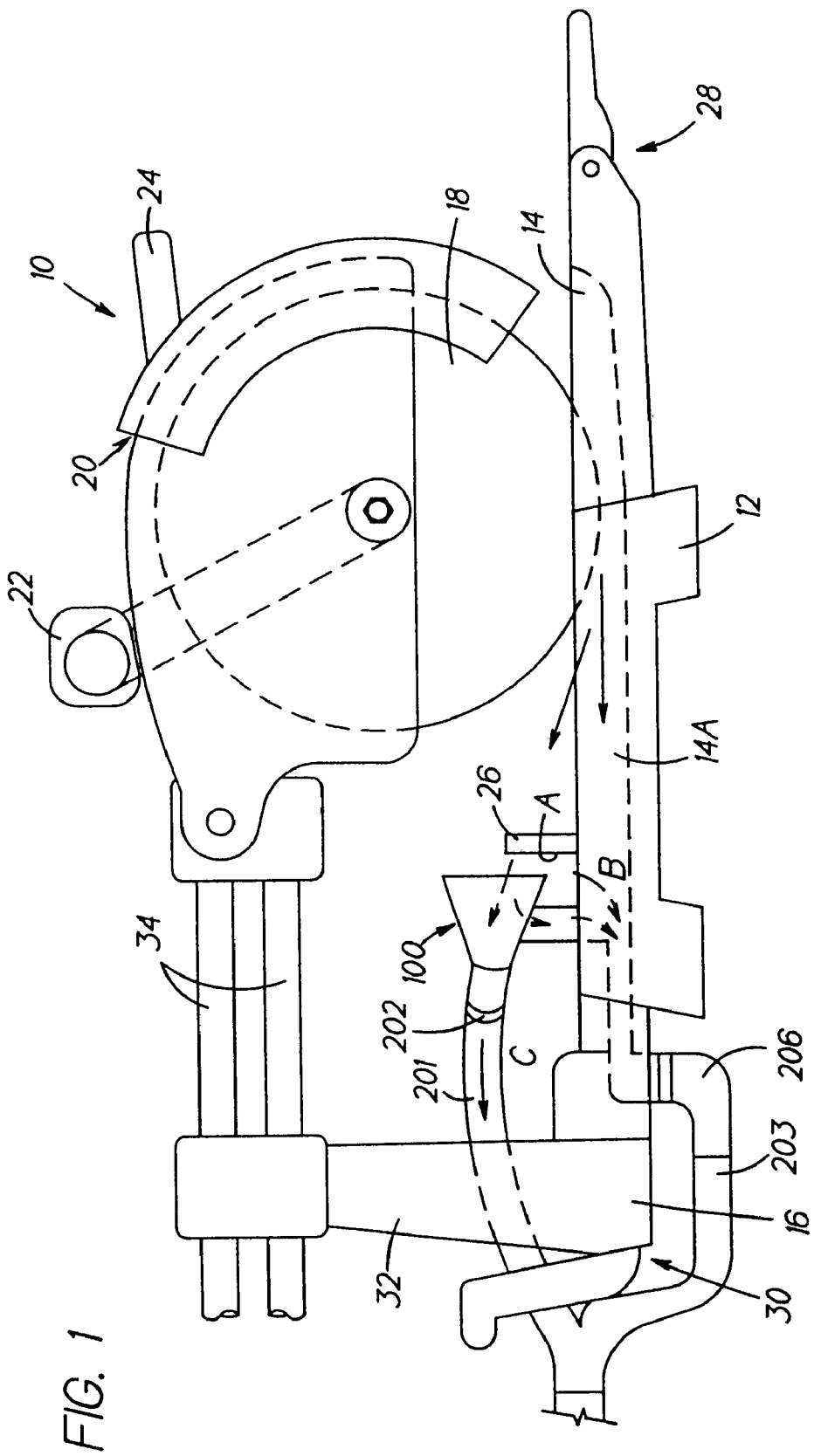
FIG. 1 is a partial cross-sectional side view of a miter saw with a dust collector according to the present invention.
Figure 2:
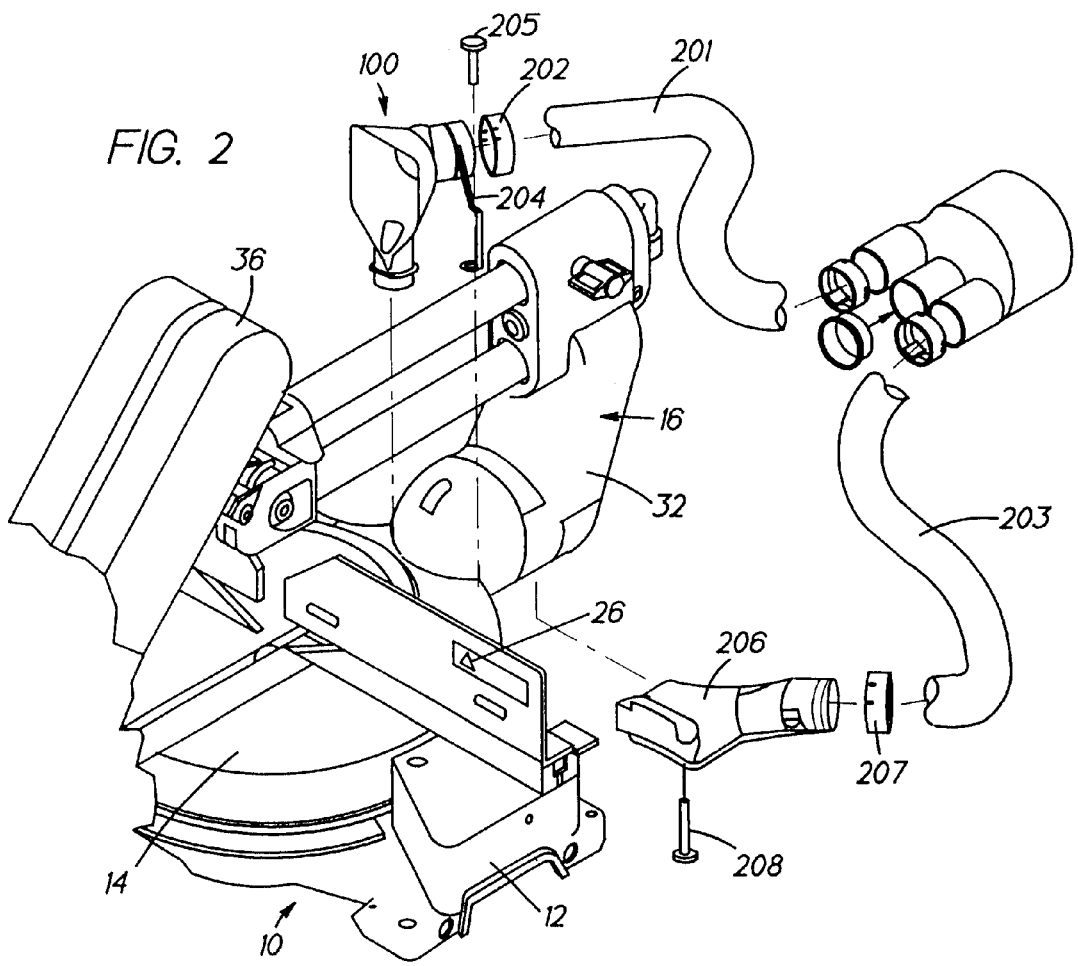
FIG. 2 is a partial perspective view of the miter saw and dust collector of FIG. 1.
Figure 3:
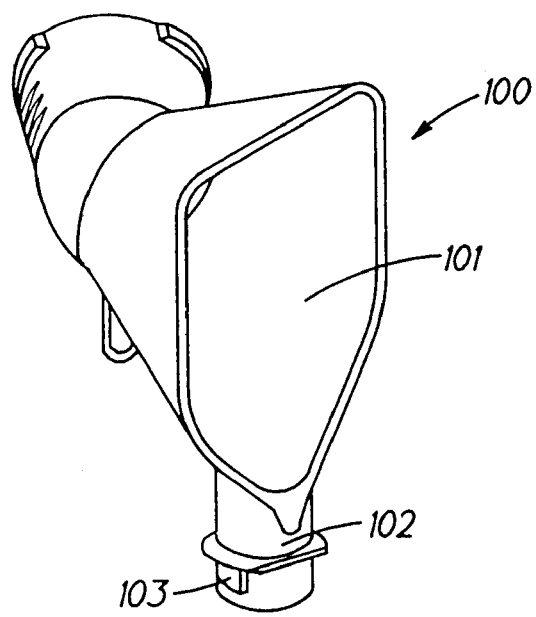
FIG. 3 is a perspective view of the dust collector of FIG. 1.
Figure 4:
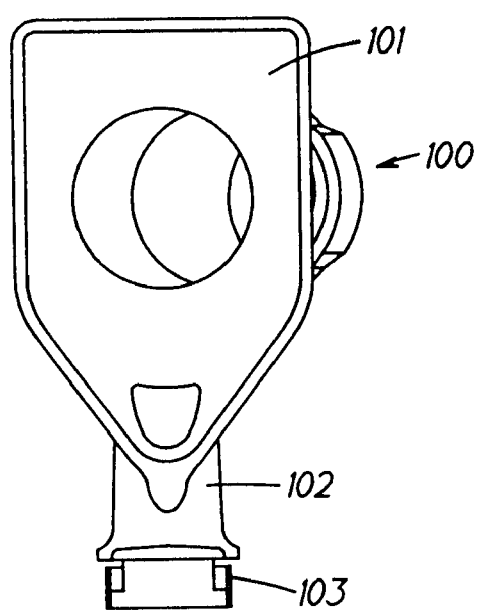
FIG. 4 is a front view of the dust collector of FIG. 1.
Figure 5:
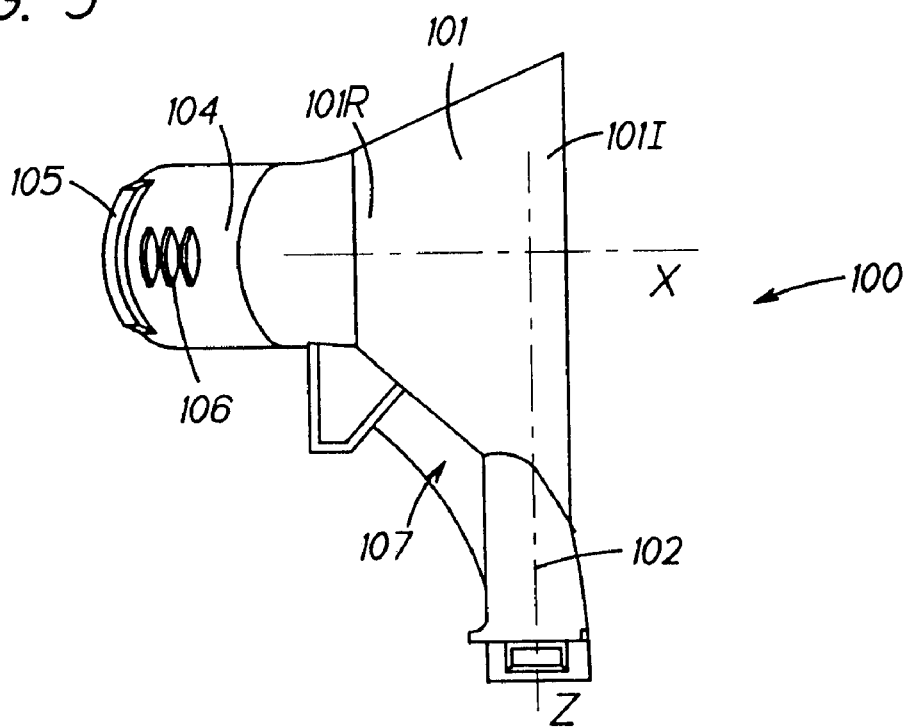
FIG. 5 is a side view of the dust collector of FIG. 1.
Figure 6:
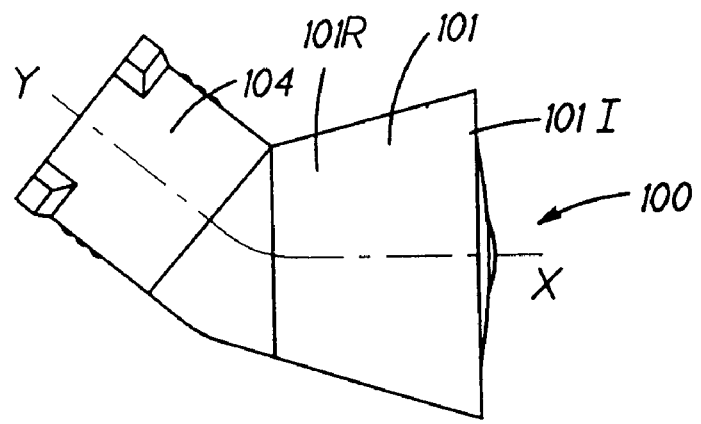
FIG. 6 is a top view of the dust collector of FIG. 1.

The invention is now described with reference to the accompanying figures, wherein like numerals designate like parts. Referring to FIGS. 1 and 2, a dust collector apparatus 100 of the present invention is disposed on a sliding compound miter saw for illustrative purposes. Persons skilled in the art however will recognize that the dust collector of the present invention may be disposed on and/or connected to any power tool, such as a compound miter saw, a chop saw, a radial arm saw, a table saw, a jigsaw, a scroll saw, a drill press, a router, etc.

Referring primarily to FIGS. 1–2, sliding compound miter saw 10 comprises a base assembly 12, a table assembly 14, a unique housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A miter locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with respect fence assembly 26. A bevel locking mechanism 30 can be activated in order to lock housing assembly 16 to table assembly 14 at any desired bevel angle.

Housing assembly 16 includes support housing 32, which mounts a pair of rails 34 for sliding movement with respect to housing 32. Saw blade 18, blade guard 20, motor 22 and handle 24 are all mounted to a drive housing 36 which is pivotably secured to rails 34. The pivoting of drive housing 36 downward towards table assembly 14 operates to open blade guard 20 and cut a workpiece which is supported by table assembly 14 and fence assembly 26. The sliding movement of rails 34 relative to housing 32 permits drive housing 36 and thus saw blade 18 to be pulled through the workpiece when the size of the workpiece exceeds the cutting width of saw blade 18.

The table assembly 14 may have a dust directing duct 14A along the blade path and below the top surface of table assembly 14. The duct 14A may also extend through table assembly 14. A duct collector 206 may be connected to table assembly 14 to further direct the dust collected from duct 14A. Preferably duct collect or 206 is fixedly attached to table assembly 14 via a screw 208. A hose 203 may be connected to collector 206 via a hose connector 207. Hose 203 is then connected to a vacuum or dust collector (not shown).

The dust collector 100 is disposed on the table assembly 14. Referring to FIG. 36, dust collector 100 comprises a main body 101 and a first nozzle portion 102 connected to the main body 101. Preferably, the main body 101 has a front inlet 101I and a rear portion 101R. The rear portion 101R may be narrower than the front inlet 101I. Preferably, the front inlet 101I is wide. The main body 101 may also have top, bottom and side walls connecting the front inlet to the rear portion. Preferably, the main body 101 is generally funnel-shaped, so that any saw dust entering through the front inlet 101I is directed towards the rear portion 101R.

Figure 7:
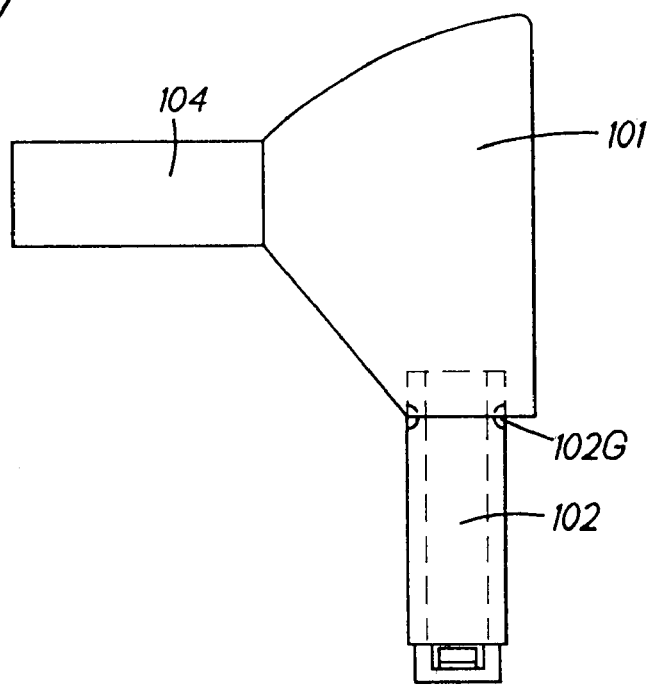
FIG. 7 is a side view of a second embodiment of the dust collector according to the present invention.

The first nozzle portion 102 is preferably connected to the bottom wall of main body 101. The first nozzle portion 102 is preferably hollow, so that saw dust can travel therethrough, along direction A as shown in FIG. 1. Preferably, the first nozzle portion 102 is fixedly attached to the main body 101. However, the main body 101 may be rotatably attached to the first nozzle portion 102 and riding on a groove 102G of portion 102, as shown in FIG. 7, to enable a user to select the angle of rotation of main body 101 relative to the blade 18.

Referring to FIGS. 1–6, the first nozzle portion 102 is preferably connected to table assembly 14 and/or duct 14A, so that saw dust can be directed therethrough, along direction B as shown in FIG. 1. The first nozzle portion 102 may also have resilient clips 103 that engage a groove (not shown) in the table assembly 14. This would also allow the user to select the angle of rotation of dust collector 100 relative to the blade 18. Persons skilled in the art will recognize that other means to provide a connection between first nozzle portion 102 and table assembly 14 may be used.

A second nozzle portion 104 may also be connected to the rear portion of the main body 101. The second nozzle portion 104 is preferably hollow, so that saw dust can travel therethrough, along direction A as shown in FIG. 1. A hose 201 may be connected to the second nozzle portion 104 to direct the flow of the dust. Accordingly, second nozzle portion 104 may have protrusions 105 to engage a hose connector 202, which in turn engages hose 201. Hose 201 may be connected to a vacuum or dust collector (not shown).

As shown in FIGS. 3–6, both main body 101 and second nozzle portion 104 have center axis X and Y, respectively. Preferably the center axis X and Y are not colinear and instead intersect at an angle, to allow the hose 201 to clear support housing 32. Furthermore, the first nozzle portion 102 may also have a center axis Z. Preferably the center axis X is substantially perpendicular to the axis X.

Second nozzle portion 104 may also have protrusions 106 to engage a wire assembly 204, which is in turn preferably connected to table assembly 14. Wire assembly 204 is used to increase the positional stability of the dust collector 100 and it may be secured to the table assembly via a screw 205.

Further, a rib 107 may be provided between the first and second nozzles to increase the strength of the dust collector 100.

As mentioned above, dust collector 100 may be disposed on a miter saw. Referring primarily to FIGS. 10–13, an exemplary compound miter saw 310 typically has a base assembly 120, including a table assembly 130, which is preferably rotatable in order to accommodate the various cutting modes discussed below. The saw 310 also includes a saw blade 140, at least partially enclosed by a blade guard 160 and driven by a motor 170, and a handle 180, which allows the operator to move the saw blade 140 and the blade guard 160 from a clear position free of a workpiece W (FIG. 13) to a cutting position with the saw blade 140 in cutting engagement with the workpiece W.

As is conventional in this type of equipment, a fence assembly, indicated generally by reference numeral 420, is interconnected with the base assembly 120 and extends laterally across the table assembly 130, against which the workpiece W is positioned and supported for performing a cutting operation thereon. The illustrated fence assembly 420 includes a fixed fence portion 422 and a movable fence portion 424, with the fixed and movable fence portions 422 and 424, respectively, extending in a mutually aligned lateral direction, and with the movable fence portion 424 being laterally spaced away from the fixed fence portion 422. Such lateral spacing or gap between the fixed and movable fence portions 422 and 424, respectively, provides clearance for the saw blade to perform a cutting operation completely through the workpiece W, regardless of the mode or type of cutting operation being performed. As is discussed in more detail below, the movable fence portion 424 is laterally movable toward and away from the fixed fence portion 422 in order to allow the operator to selectively adjust the clearance gap therebetween and thus accommodate the particular cutting operation being performed.

As is typical in this type of equipment, the compound miter saw 310 depicted in the drawings is capable of a number of different cutting modes or positions. Such positions include those for straight cross-cutting operations, straight miter-cutting operations, bevel cutting operations and various combinations of bevel cutting and miter cutting, commonly called compound cutting operations, with the adjustable fence assembly 420 being adjustable to provide the minimum required clearance gap between the fixed and movable fence portions 422 and 424, respectively, in any of these cutting modes.

These various cutting operations or working modes, or combinations thereof, are accomplished by way of a compound pivot mechanism 434, including a pivot arm assembly 421, which is pivotally interconnected with the rotatable table assembly 130. The pivot arm assembly 421 includes a pivot mechanism 423 providing for pivotal movement of the saw blade 140 into and out of engagement with the workpiece W, and a pivot mechanism 425 providing for pivotal movement of the saw blade 140 among a number of square or bevel cutting configurations. Lateral swinging movement is accomplished by way of the above-mentioned table assembly 130, which is disposed for rotation relative to the base assembly 120, thus accommodating movement among the various cutting configurations.

The pivot arm assembly 421 includes a bifurcated lower and rearward end configuration, with this portion of the pivot arm assembly 421 being split to form a pair of pivot legs 429 and 431 with a space therebetween.

The dust collector 100 may be disposed on table assembly 130. Preferably, the height of dust collector 100 will be such so that it does not contact pivot arm assembly 421, as the assembly 421 is lowered. Alternatively, the shape of the main portion 101 may be such so that it can fit in the space between pivot legs 429 and 431 as the assembly 421 is lowered.

Preferably dust collector 100 is connected to a dust duct 130A disposed within table assembly 130, in a manner similar to duct 14A. Similarly, a hose 201 may be connected to main portion 101 as discussed above.

Figure 13:
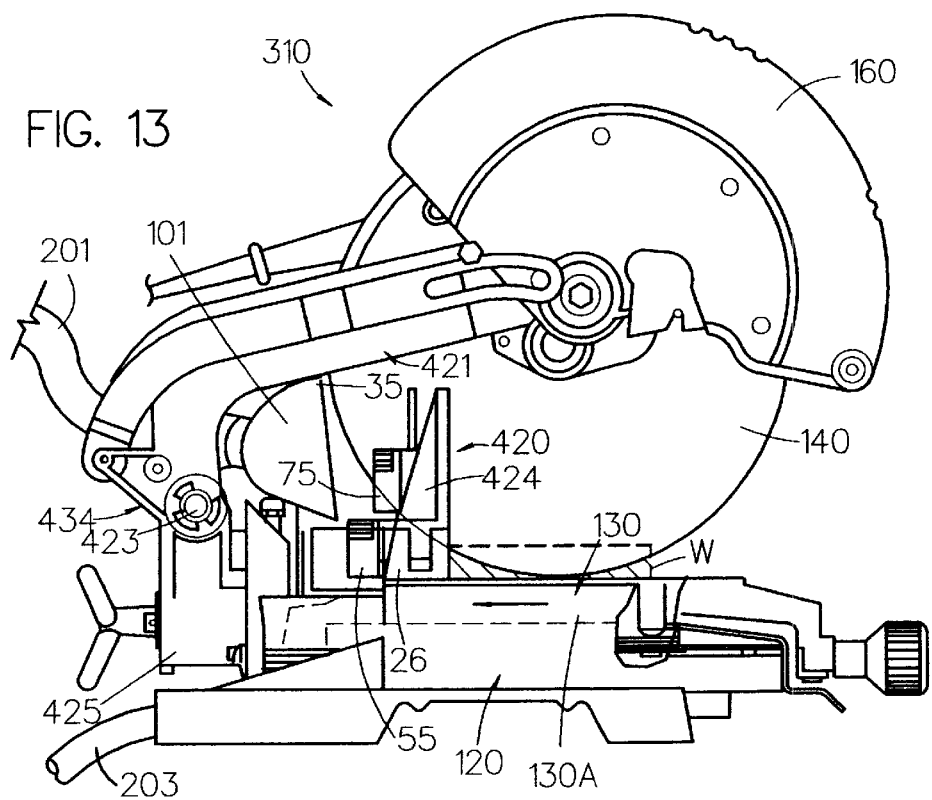
FIG. 13 is a left elevational view of the compound miter saw of FIG. 10.
Figure 14:
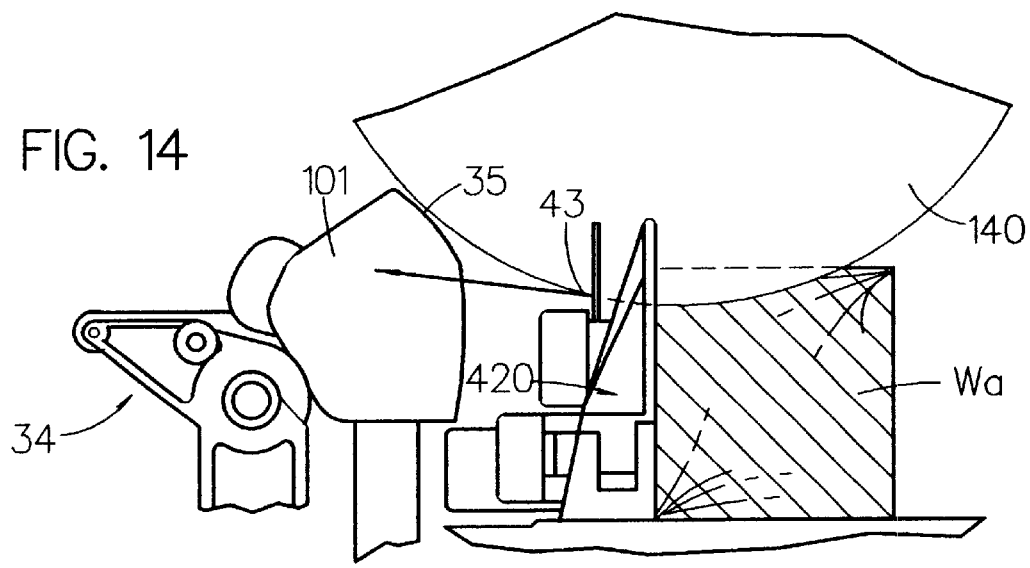
FIG. 14 is a schematic elevational view, diagrammatically illustrating the compound miter saw use for cutting a relatively thick workpiece.
Figure 15:
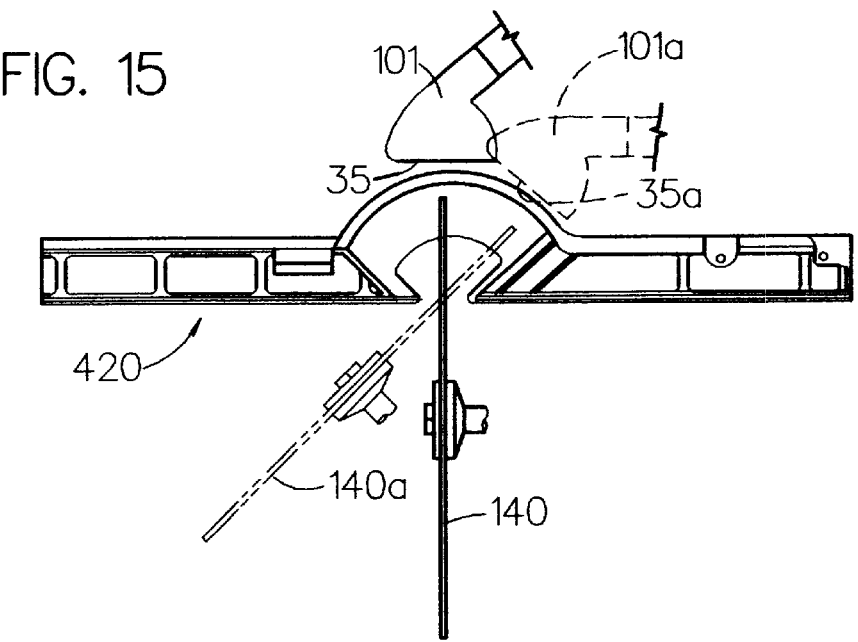
FIG. 15 is a schematic top plan view, diagrammatically illustrating the exemplary compound miter saw use for performing a miter-cutting operation.

As shown in FIGS. 13–15, the dust collector pivotally moves with the rotatable table assembly 130, and thus with the saw blade 140, into and out of engagement with the workpiece W (or even a workpiece Wa of different size or shape) in any of the miter cutting operations. Preferably, the orientation of the dust collector 100 is such that the opening 35 of main portion 101 is aligned substantially along a line 43 between the dust-receiving opening 35 and the periphery of the saw blade 140, with the line 43 extending along a tangent to the rotation of the saw blade 140 at a location thereon at which the saw blade 140 engages the workpiece W (or Wa).

FIG. 15 schematically or diagrammatically illustrate a significant feature of the present invention, wherein the orientation of the dust receiving opening 35 of dust collector 100 remains constant relative to the saw blade 140, regardless of the rotation of table assembly 130. Accordingly, a miter-cutting operation is diagrammatically illustrated, with exemplary miter-cutting positions of the blade 140, main portion 101 of dust collector 100, and the dust-receiving opening 35 being shown in phantom lines and indicated by reference numerals 140a, 101a, and 35a, respectively.

FIG. 16 illustrates one way of adapting dust collector 100 in order to accommodate bevel-cutting operations. Instead of providing a generally funnel-shaped main portion 101, main portion 101B has been modified by extending dust-receiving opening 35b to cover the different possible bevel angles.

Figure 8:
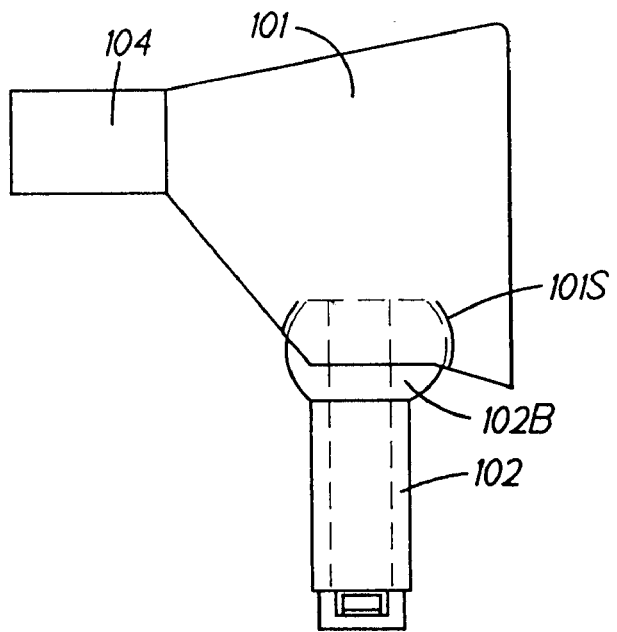
FIG. 8 is a side view of a third embodiment of the dust collector according to the present invention.
Figure 12:
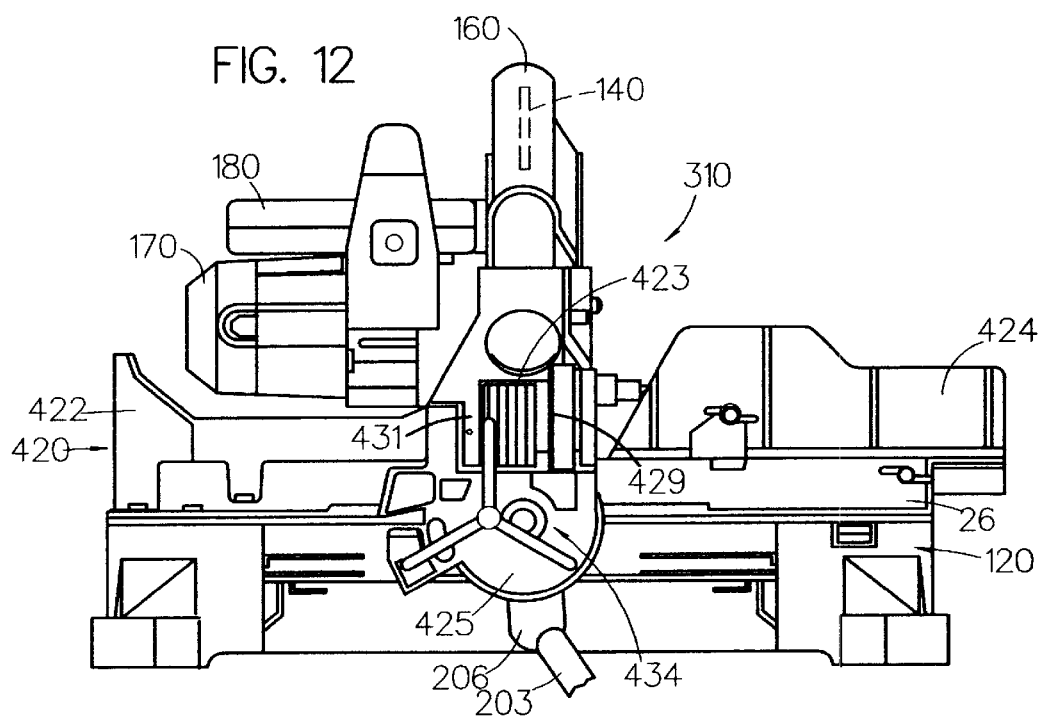
FIG. 12 is a rear elevational view of the compound miter saw of FIG. 10.

Persons skilled in the art may recognize other alternatives to the means disclosed herein, for example, a ball and socket junction (101S and 102B) may be disposed between main body 101 and first nozzle portion 102 in order to allow rotational movement of main body 101 along different axis, as shown in FIG. 8. Similarly, main body 101 and first nozzle portion 102 may be connected via a hinge 102H to allow rotation of main body 101 relative to portion 102. However, all these additions and/or alterations are considered to be equivalents of the present invention.

What is claimed is:

1. A saw comprising:
    a base assembly including a planar surface for supporting a workpiece thereon, the base assembly having a dust duct underneath the planar surface;
    a pivot arm pivotally connected to the base assembly;
    a saw assembly supported by the pivot arm, the saw assembly comprising a motor driving a rotatable cutting tool; and
    a dust collector disposed on the base assembly, said dust collector comprising a main body and a first nozzle portion, said first nozzle portion having first and second end, said first end being connected to the main body and said second end being connected to the planar surface, the first nozzle portion extending substantially upwardly tom the planar surface;
    wherein at least some saw dust received via the main body travels through the planar surface via the first nozzle portion.

2. The saw of claim 1, wherein the base assembly comprises a rotatable table.

3. The saw of claim 2, wherein the dust collector is connected to the table.

4. The saw of claim 1, wherein the main body has a front inlet and a rear portion narrower than the front inlet.

5. The saw of claim 4, wherein the main body has a bottom wall connecting the front inlet to the rear portion.

6. The saw of claim 5, wherein the first end of the first nozzle portion is connected to the bottom wall.

7. The saw of claim 4, further comprising a second nozzle portion connected to the rear portion of the main body.

8. The saw of claim 1, wherein the main body is substantially funnel-shaped.

9. The saw of claim 1, further comprising at least one resilient clip at the second end, said resilient clip releasably engaging the base assembly.

10. The saw of claim 1, wherein the main body has a centerline.

11. The saw of claim 10, wherein the centerline of the main body is substantially horizontal.

12. The saw of claim 10, wherein the first nozzle portion is substantially perpendicular to the centerline of the main body.

13. A The saw of claim 1, wherein the main body is movably connected to the first nozzle portion.

14. The saw of claim 1, wherein the main body is pivotably connected to the first nozzle portion.

15. The saw of claim 1, wherein said first nozzle portion communicates with said dust duct such that dust sent through the first nozzle portion is received in said dust duct.

16. The saw of claim 1, wherein a hose is connected to the dust duct.

* * * * *